United States Patent
Shetty et al.

(10) Patent No.: US 12,248,682 B1
(45) Date of Patent: Mar. 11, 2025

(54) MANAGING DATA PROCESSING SYSTEMS BY MONITORING FOR FAILURE

(71) Applicant: Dell Products L.P., Round Rock, TX (US)

(72) Inventors: Sudhir Vittal Shetty, Cedar Park, TX (US); Deepak Nagarajegowda, Raleigh, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/417,296

(22) Filed: Jan. 19, 2024

(51) Int. Cl.
*G06F 3/06* (2006.01)

(52) U.S. Cl.
CPC .......... *G06F 3/0616* (2013.01); *G06F 3/0619* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 5,557,183 A * | 9/1996 | Bates | ............... | G11B 19/06 318/434 |
| 9,218,849 B1 * | 12/2015 | Trantham | ............... | G11B 27/36 |
| 2017/0344431 A1 * | 11/2017 | Coatney | ............... | G06F 11/004 |
| 2020/0371878 A1 * | 11/2020 | Chaiken | ............... | G06F 9/4401 |
| 2021/0034450 A1 * | 2/2021 | Vishwakarma | ....... | G06F 3/0689 |
| 2021/0117822 A1 * | 4/2021 | Vishwakarma | ....... | G06N 20/00 |
| 2021/0173582 A1 * | 6/2021 | Kazi | ............... | G06F 3/0653 |
| 2021/0264298 A1 * | 8/2021 | Elyasi | ............... | G06F 11/3037 |
| 2021/0342205 A1 * | 11/2021 | Mcguinness | ....... | G06F 3/0616 |
| 2024/0126837 A1 * | 4/2024 | Martin | ............... | G06N 3/045 |
| 2024/0193024 A1 * | 6/2024 | Sethi | ............... | G06N 5/01 |
| 2024/0264763 A1 * | 8/2024 | Sethi | ............... | G06F 3/0653 |
| 2024/0345906 A1 * | 10/2024 | Kwon | ............... | G06F 11/0727 |
| 2024/0362100 A1 * | 10/2024 | Zhang | ............... | G06F 11/0757 |
| 2024/0362101 A1 * | 10/2024 | Breitenbach | ....... | G06N 3/0464 |

* cited by examiner

*Primary Examiner* — Kevin Verbrugge
(74) *Attorney, Agent, or Firm* — Womble Bond Dickinson (US) LLP

(57) ABSTRACT

Methods and systems for managing data processing systems are disclosed. Data processing systems may be managed by monitoring for failure of a storage device. The storage device may be monitored by obtaining use data and diagnostic data for a storage device. The use data may be obtained to generate predicted future use data. The use data and the predicted future use data may be used to generate a use quantification. The use quantification and the diagnostic data may be ingested in a predictive algorithm to obtain a prediction of the operation of a storage device. The prediction may indicate the likelihood for failure of the storage device.

20 Claims, 6 Drawing Sheets

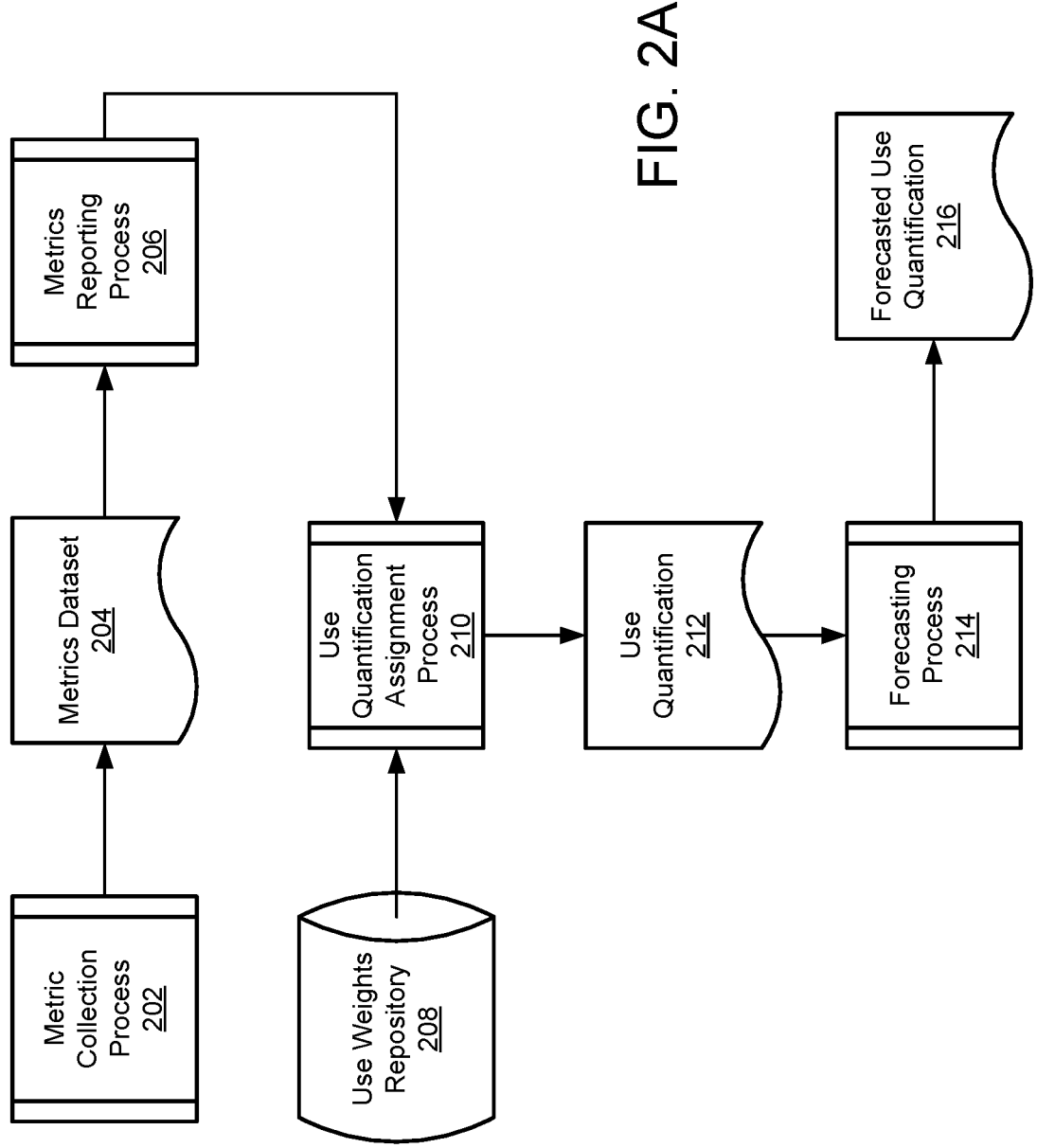

MANAGING DATA PROCESSING SYSTEMS BY MONITORING FOR FAILURE

FIELD

Embodiments disclosed herein relate generally to managing data processing systems. More particularly, embodiments disclosed herein relate to management of data processing system through monitoring for and prediction of disk failures of data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2B show data flow diagrams illustrating operation of a system in accordance with an embodiment.

DETAILED DESCRIPTION

Figure 1A:
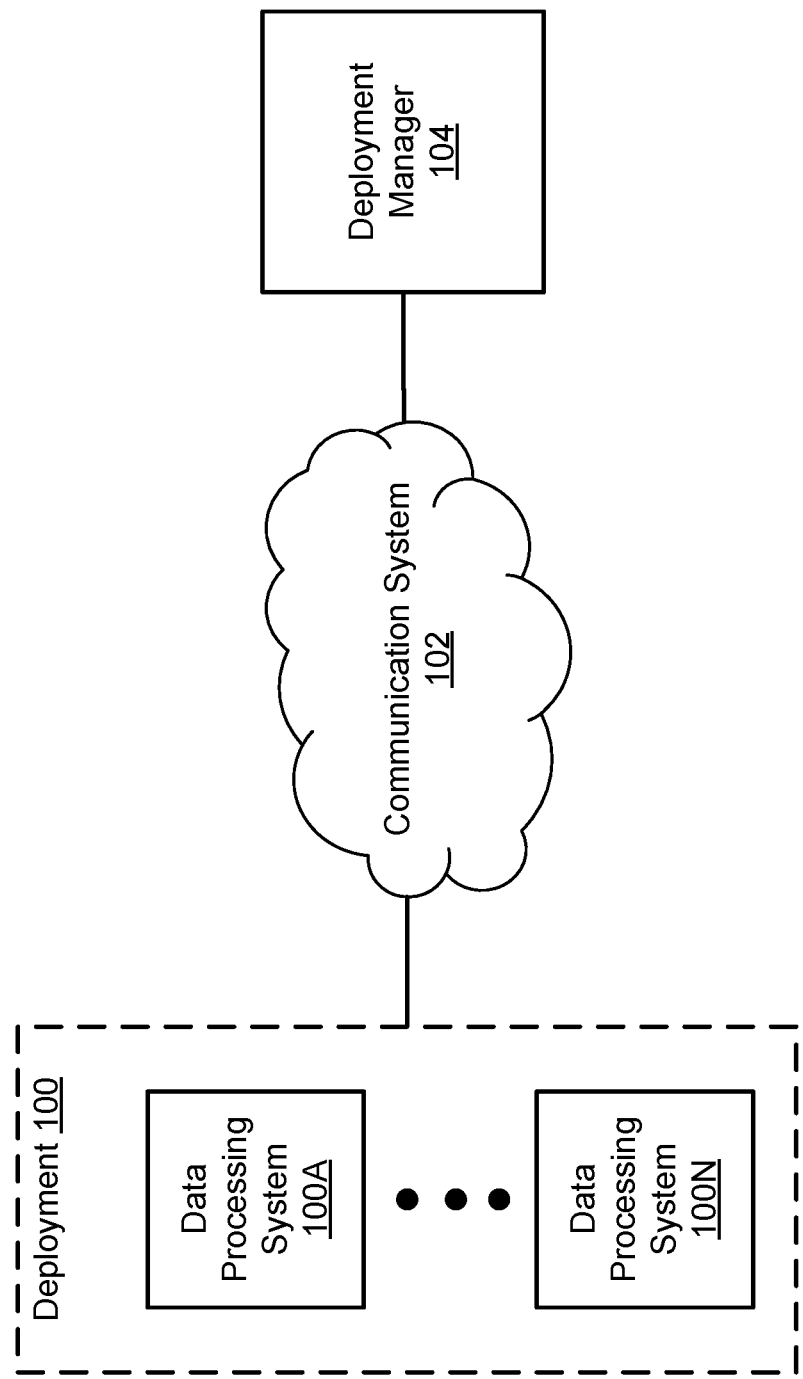
FIG. 1A shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may be managed by monitoring for failure of storage devices. Failure of storage devices may be monitored by ingesting a use quantification and diagnostic data in a predictive algorithm and obtaining a prediction that may indicate failure.

The use quantification may be determined from use data and predicted future use data for one future data of a set of future dates. The use data may include information relating to, at least, storage utilization, central processing unit utilization, and storage capacity of the storage drive. The use quantification may be a weighted sum of the use data and the predicted future use data. The diagnostic data may include information relating to, at least, read statistics, physical condition, and error counts of the storage device.

Using a prediction of failure of the storage device by the predictive algorithm, proactive steps may be taken to ensure continued operation of the storage device. Proactive steps may include increasing the frequency of telemetry data from the storage device, shifting a workload from the storage device to another storage device, and initiating servicing of the storage device.

In an embodiment, a method for managing data processing systems is disclosed. The method may include: (i) obtaining use data for a storage device and diagnostic data for the storage device, the storage device being part of one of the data processing systems; (ii) obtaining, using the use data, predicted future use data for each future date of a set of future dates; (iii) obtaining, using the use data and the predicted future use data for one future date of the set of the future dates, a use quantification; (iv) obtaining, using the use quantification and the diagnostic data, a prediction regarding operation of the storage device for the one future date of the set of the future dates; (v) making a determination regarding whether the prediction indicates failure in the operation of the storage device by the one future date of the set of the future dates; and (iv) in a first instance of the determination where the prediction indicates the failure in the operation of the storage device by the one future date of the set of the future dates: (a) performing a proactive action set to manage a predicted impact of the failure in the operation on the storage device by the one future date of the set of future dates.

Obtaining the use data for the storage device and the diagnostic data for the storage device may include obtaining, by a management controller hosted by the one of the data processing systems, the use data for the storage device and the diagnostic data for the storage device.

The use data includes information relating to, at least, storage utilization of the storage device, central processing unit utilization of a processor of the one of the data processing systems, and storage capacity of the storage device.

The diagnostic data includes information relating to, at least, read statistics, physical condition, and error counts of the storage device.

Obtaining the use quantification may include obtaining a weighted sum of the use data and the future use data for the one future date of the set of the future dates.

The use quantification comprises a composite measure of predicted use and present use of the storage device.

Obtaining the prediction regarding operation of the storage device may include ingesting the use quantification and the diagnostic data in a predictive algorithm to obtain the prediction.

Performing the proactive action set may include at least one action selected from a list of actions consisting of: (i) increasing a frequency of requests for telemetry data from the storage device; (ii) initiating performance of a diagnostic workload on the storage device and monitoring an operation of the storage device while performing the diagnostic workload; (iii) removing a workload from the storage device; and (iv) scheduling servicing of the storage device by a technician.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, data may need to be stored and retrieved in the future. To store and retrieve the data, one or more hard disk drives (HDDs), solid-state drives (SSDs), and/or other types of storage devices (e.g., "data storage devices") may provide data storage services.

However, over time the data storage devices may be subject to failure and/or other forms of undesired operation. If the data storage devices experience undesired operation, then the data storage devices may be unable to provide all, or a portion of the data storage services.

Further, the computer implemented services may be impacted if the data storage devices are unable to provide the data storage services. For example, data that is necessary to provide the computer implemented services may be unable to be stored and/or retrieved, the rate of data storage/retrieval may be slower than expected, and/or the computer implemented services may be impacted in other manners.

In general, embodiments disclosed here relate to systems and methods for managing the impact of storage device failure. To manage the impact of storage device failure, predictions for future failures of the storage devices may be obtained and used to reduce potential impacts of the predicted data storage device failures.

To predict the storage device failure, the data storage devices may be monitored. The data storage devices may be monitored via (i) self-reporting mechanisms regarding device health (e.g., Self-Monitoring, Analysis and Reporting Technology (SMART), and (ii) via system reporting mechanisms regarding device use (e.g., operating system reports of use of the data storage devices).

The system reporting of the data storage device use may be used to predict future workloads (e.g., or a normalized quantity, such as a workload index) for the data storage devices. The predicted future workloads and self-reported data storage device may be used to predict if and/or when a data storage device is likely to fail in the future.

If a failure is predicted to occur, various proactive actions may be performed to reduce impacts of the predicted failure. For example, the data storage device may be replaced, the use of the data storage device may be reduced, and/or other actions may be performed to manage potential impacts of the predicted failure.

To provide the above noted functionality, the system may include deployment 100, and deployment manager 104. Each of these components is discussed below.

Figure 1B:
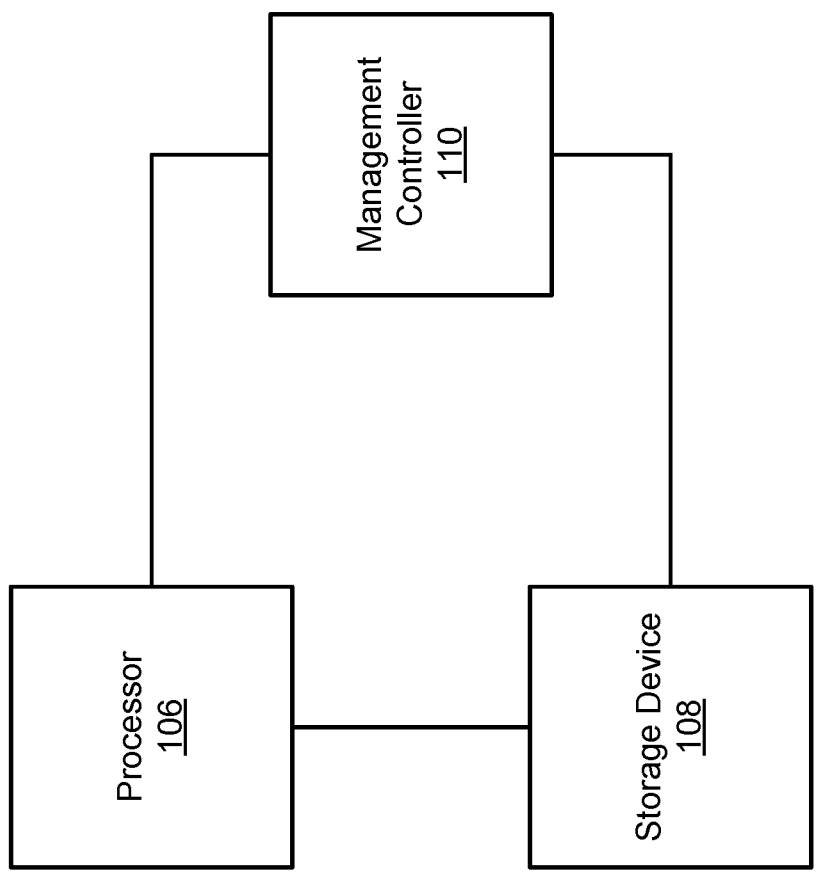
FIG. 1B shows a diagram illustrating portions of a data processing system in accordance with an embodiment.

Deployment 100 may include any number of data processing system 100A-100N. The data processing systems may provide all, or a portion, of the computer implemented services provided by the system of FIG. 1A. To do so, each data processing system may include hardware components such as storage devices, processors, etc. Refer to FIG. 1B for additional details regarding the hardware components of the data processing systems 100.

During operation, data processing system 100A-100N may (i) track the health and use of data storage device (e.g., in aggregate data storage device information), (ii) use the tracked data storage device information to predict future data storage device failures, and/or (iii) attempt to manage the impacts of predicted data storage device failure. To use the tracked data storage device information to predict data storage device failures, the data storage device information may be provided to other devices (e.g., deployment manager 104) and/or may be used logically with an inference model that may ingest and use the ingested data storage device information to predict future failures.

Deployment manager 104 may manage computer implemented services provided by deployment 100. To do so, deployment manager 104 may (i) collect the data storage device information, (ii) use the data storage device information to predict future data storage device failures, and (iii) attempt to mitigate the potential impacts of predicted data storage device failures.

To mitigate the potential impacts of the predicted data storage device failures, deployment manager 104 may, for example, (i) schedule replacement of data storage device, (ii) schedule service of data storage device, (iii) modify the operation of deployment 100 to reduce use of data storage devices that have been predicted to fail in the future, (iv) initiate generation of backups of data stored in data storage device that are predicted to fail in the future, and/or (v) perform other actions that are likely to reduce the potential impacts of data storage device failures.

Figure 2B:
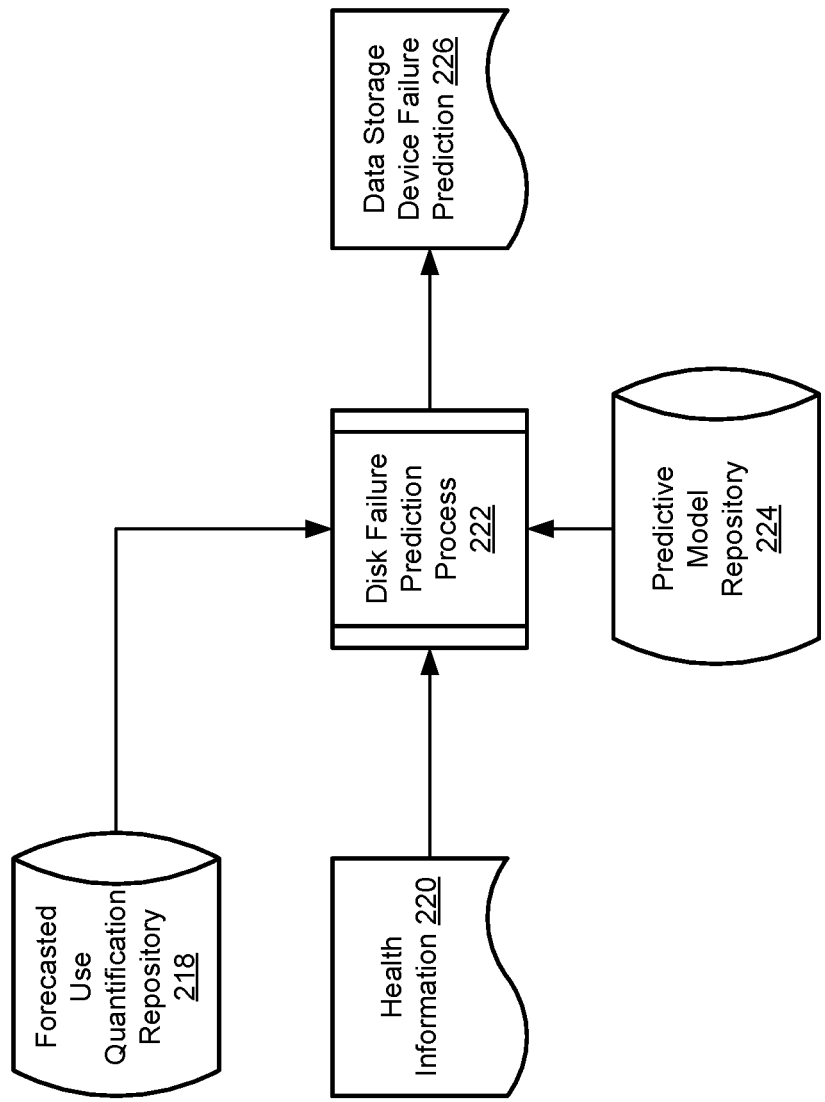
Figure 3:
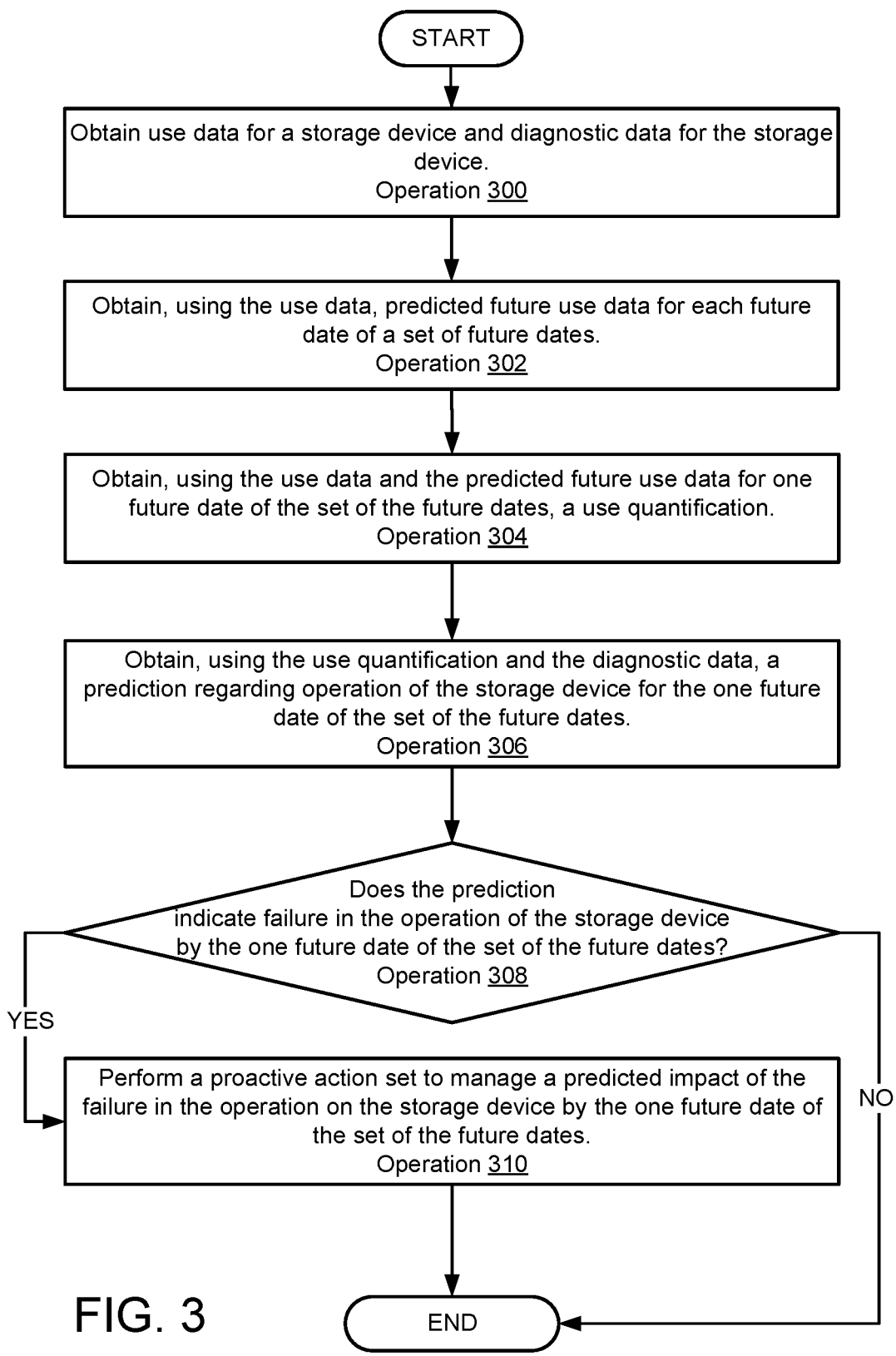
FIG. 3 shows flow diagrams illustrating methods in accordance with an embodiment.

While providing their functionality, any of deployment 100 and deployment manager 104 may perform all, or a portion, of the flows and methods shown in FIGS. 2A-3.

Any of (and/or components thereof) deployment 100 and deployment manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1A as including a limited number of specific components, a system in accordance with an embodiment may include fewer, additional, and/or different components than those components illustrated therein.

Turning to FIG. 1B, a portion of a data processing system in accordance with an embodiment is shown. To provide the above noted functionality, a data processing system may include processor 106, storage device 108, and management controller 110. Each of these components is discussed below.

Processor 106 may be implemented using a hardware processor such as a central processing unit and/or other types of processing devices. Processor 106 may be coupled to storage device 108 via an in-band channel to facilitate storage and use, by processor 106, of data in storage device 108.

Storage device 108 may be implemented using any type of physical data storage device such as a hard disk drive.

Management controller 110 may be implemented with a baseband controller (e.g., an independently operating computing system) operably connected to processor 106 and/or storage device 108 via one or more out-of-band channels. Via these channels, management controller 110 may collect health information regarding storage device 108 (e.g., which it may self-report) and use information regarding storage device 108 (e.g., an operating system executing on processor 106 may manage use of storage device 108, and may track various information regarding the use of storage device 108 such as input-output (IO) size, queue lengths, latency, bandwidth/throughput, IO per unit time (IOPS).

Additionally, management controller 110 may collect use information for processor 106 (e.g., processor utilization rates over time), capacity information (e.g., total space, total free space, total used space, etc.) for storage device 108, and/or other telemetry information from hardware components of a data processing system.

The collected information may be provided to deployment manager 104 for further processing (e.g., failure prediction generation), and/or may be used locally for failure prediction generation). Refer to FIGS. 2A-2B for additional information regarding failure prediction.

Figure 4:
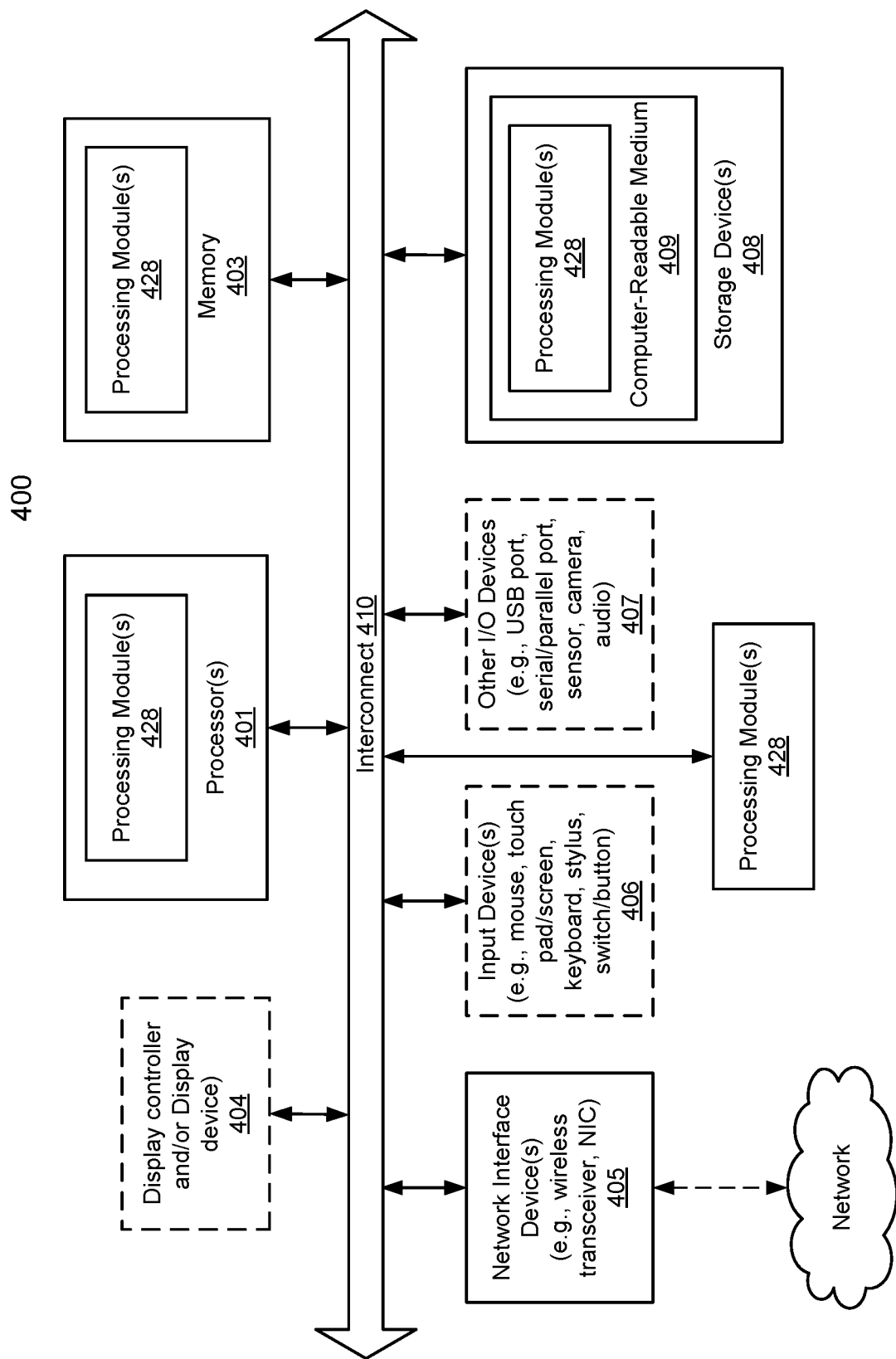
FIG. 4 shows a block diagram illustrating a data processing system in accordance with an embodiment.

While illustrated in FIG. 1B as including a limited number of specific components, a data processing in accordance with an embodiment may include fewer, additional, and/or different components (e.g., as shown in FIG. 4) than those components illustrated therein without departing from embodiments disclosed herein.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200A, 200N, 212, 216, etc.) is used to represent data structures, a second set of shapes (e.g., 202, 206, etc.) is used to represent processes performed using and/or that generate data, and a third set of shapes (e.g., 208, 218, etc.) is used to represent large scale data structures such as databases.

Turning to FIG. 2A, a first data flow diagram in accordance with an embodiment is shown. The first data flow diagram may illustrate data used in and data processing performed in acquisition of data used to predict if and when a data processing system is likely to fail in the future.

To predict if and when a data storage device is likely to fail (or otherwise operate in an undesired manner) in the future, metric collection process 202 may be performed. During metric collection process 202, various metrics regarding the operation of data storage devices of a data processing system is collected. The metrics may be aggregated as metrics dataset 204.

To collect the metrics, a management controller of a host data processing system may communicate with both the data storage devices and other hardware components. The data storage devices may provide health information for each respective data storage device. The other hardware components may provide information regarding (i) the use of the data storage devices, and/or (ii) use of the other hardware components. For example, the management controller may, to obtain the use information, issue a request to an operating system executing on a processor. The request may cause the operating system (which may manage use of storage devices) to quantify and provide information regarding the use of the data storage devices, the processor, and/or other hardware components of the data processing systems.

Thus, metric dataset 204 may include health information for storage devices (e.g., the health information may include, for example, temperature, unexpected power loss event count, erase fail count, power-on hours, and/or raw head error rate), use information for the data storage devices, and use information for other hardware components of the data processing system.

Once metrics data set 204 is obtained, metrics reporting process 206 may be performed. During metrics reporting process 206, metrics dataset 204 may be provided to other entities such as deployment manager 104. Once metrics dataset 204 is obtained, use quantification assignment process 210 may be performed.

During use quantification assignment process 210, a workload index (or other normalized quantification) regarding the use of each data storage device may be obtained. To obtain the workload index, the use information for each respective data storage device may be ingested into a model, function, and/or other type of quantification model. The quantification model may have an analytic form the provides the workload index as a function of the use information. The analytic form may be a weighted sum of the attributes from metrics dataset 204. The resulting workload index may be stored as use quantification 212.

Once use quantification 212 is obtained, forecasting process 214 may be performed. During forecasting process 214, future workload indexes may be predicted using use quantification 212. For example, previously collected time series of workload indexes for various data storage devices may be used with linear regression, machine learning, and/or other models to obtain one or more forecasting models. When use quantification 212 is ingested into the forecasting model, various predicted workload indexes for future points in time may be obtained (e.g., one or more months or years into the future).

Thus, when forecasting process 214 is complete, a set of workload indexes from the present out into the future may be obtained. Once these workload indexes are obtained, final aggregate workload indexes may be obtained. To obtain the final aggregate workload indexes, forecasted use quantification 216 may be performed. During forecasted use quantification 216, weighted sums of the current and predicted workload indexes may be obtained for each prediction period.

For example, if a current workload index has a value of 0.5, and a predicted workload index for 3-months into the future has a value of 0.8, then the final forecasted use quantification (e.g., a final aggregated workload index) may be obtained for the 3-month into the future period of time by weighting the current value of 0.5 by a first weight, weighting the predicted value of 0.8 by a second weight, and summing the weighted values (e.g., if a weight for the current value is 0.75 and a weight for the predicted value is 0.25, then the final value may be 0.5*0.75+0.8*0.25=0.575). Thus, the final forecasted use quantification for a point in time three months into the future may be 0.575.

Any number of forecasted use quantification may be calculated in this manner and used to predict the likelihood of failure of a data storage device. These predicted use quantifications may be stored in a repository, such as forecasted use quantification repository 218, discussed with respect to FIG. 2B.

Turning to FIG. 2B, a second data flow diagram in accordance with an embodiment is shown. The second data flow diagram may illustrate data used in and data processing performed in prediction of data storage device failures (and/or other undesired operation of data storage devices).

To predict data storage device failure, disk failure prediction process 222 may be performed. During disk failure prediction process 222, health information 220 and final forecasted use quantifications (e.g., from forecasted use quantification repository 218) for different periods of time may be ingested into various prediction models stored in predictive model repository 224. The predictive models may predict if and when storage devices are likely to fail in the future based on the ingested information.

For example, predictive model repository 224 may include various predictive models such as linear regression models, machine learning models, and/or other types of models trained using training data (e.g., similar to the information in forecasted quantification repository 218 and health information 220 but for past occurrences of failures of data storage devices thus providing corresponding labels).

The resulting predicted data storage device failures may be stored as data storage device failure prediction 226.

Once obtained, data storage device failure prediction 226 may be used to manage impacts of any predicted failures. For example, failures may be keyed to various actions. The keyed actions may be selected and queued for performance to manage potential impacts of the predicted data storage device failures.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1A may perform various methods to manage data processing systems. FIG. 3 illustrates a method that may be performed by the components of the system of FIG. 1A. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing data processing systems in accordance with an embodiment is shown. The method may be performed, for example, by any of the components of the system of FIG. 1A, and/or other components not shown therein.

At operation 300, use data for a storage device and diagnostic data (e.g., health information) for a storage device may be obtained. Use data for a storage device and diagnostic data for a storage device may be obtained by a management controller. The management controller may issue out-of-band requests to the storage device and/or other hardware components of the data processing system.

At operation 302, predicted future use data for each future data of a set of future dates may be obtained using the use data. The predicted future use data for each of the future data of the set of the future dates may be obtained by ingesting the set of the future dates and/or the obtained use data into a predictive algorithm to obtain the predicted future use data.

At operation 304, a use quantification may be obtained using the use data and the predicted future use data for each future date of the set of future dates. The use quantification may be obtained by obtaining a weighted sum of the use data and the future use data for the one future date of the set of future dates. The weighted sum of the use data and the future use data may be obtained by ingesting the use data and the future use data into a summation that weights the use data and the future use data with predefined weights.

At operation 306, a prediction regarding operation of the storage device for the one future date may be obtained using the use quantification and the diagnostic data. The prediction may be obtained by ingesting the use quantification and the diagnostic data in a predictive algorithm to obtain the prediction.

At operation 308, a determination may be made regarding whether the prediction indicates failure in the operation of the storage device by the one future date of the set of the future dates. The prediction may directly indicate whether a failure is predicted.

If the prediction indicates failure in the operation of the storage device by the one future date of the set of the future dates, then the method may proceed to operation 310. Otherwise, if the prediction does not indicate failure in the operation of the storage device by the one future date of the set of the future dates, then the method may end following operation 308.

At operation 310, a proactive action set may be performed to manage the predicted impact of the failure in the operation on the storage device by the one future date of the set of the future dates. The proactive action set may be performed by performing at least one action selected from a list of actions consisting of: (i) increasing a frequency of requests for telemetry data from the storage device, the telemetry data comprising at least one of the use data and the diagnostic data; (ii) initiating performance of a diagnostic workload on the storage device and monitoring an operation of the storage device while performing the diagnostic workload;

(iii) removing a workload from the storage device (e.g., electing to store data elsewhere); and (iv) scheduling servicing of the storage device by a technician.

A frequency of requests for telemetry data from the storage device may be increased by sending requests for the use data and/or the diagnostic data to the management controller at an increased frequency. The performance of the diagnostic workload may be initiated and the operation may be monitored by implementing diagnostic tests and observing responses from the diagnostic tests on the storage device. A workload from the storage device may be removed by moving the workload from the storage device to another storage device. Servicing of the storage device by a technician may be scheduled by setting one or more times for the technician to repair the storage device.

The method may end following operation 310.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

The invention claimed is:

1. A method for managing data processing systems, the method comprising:
obtaining use data for a storage device and diagnostic data for the storage device, the storage device being part of one of the data processing systems;
obtaining, using the use data, predicted future use data for each future date of a set of future dates;
obtaining, using the use data and the predicted future use data for one future date of the set of the future dates, a use quantification;
obtaining, using the use quantification and the diagnostic data, a prediction regarding operation of the storage device for the one future date of the set of the future dates;
making a determination regarding whether the prediction indicates failure in the operation of the storage device by the one future date of the set of the future dates; and
in a first instance of the determination where the prediction indicates the failure in the operation of the storage device by the one future date of the set of the future dates:
performing a proactive action set to manage a predicted impact of the failure in the operation on the storage device by the one future date of the set of future dates.

2. The method of claim 1, wherein obtaining the use data for the storage device and the diagnostic data for the storage device comprises:
obtaining, by a management controller hosted by the one of the data processing systems, the use data for the storage device and the diagnostic data for the storage device.

3. The method of claim 1, wherein the use data comprises information relating to, at least, storage utilization of the storage device, central processing unit utilization of a processor of the one of the data processing systems, and storage capacity of the storage device.

4. The method of claim 1, wherein the diagnostic data comprises information relating to, at least, read statistics, physical condition, and error counts of the storage device.

5. The method of claim 1, wherein obtaining the use quantification comprises:
obtaining a weighted sum of the use data and the future use data for the one future date of the set of the future dates.

6. The method of claim 1, wherein the use quantification comprises a composite measure of predicted use and present use of the storage device.

7. The method of claim 1, wherein obtaining the prediction regarding operation of the storage device comprises:
ingesting the use quantification and the diagnostic data in a predictive algorithm to obtain the prediction.

8. The method of claim 1, wherein performing the proactive action set comprises at least one action selected from a list of actions consisting of:
increasing a frequency of requests for telemetry data from the storage device, the telemetry data comprising at least one of the use data and the diagnostic data;
initiating performance of a diagnostic workload on the storage device and monitoring an operation of the storage device while performing the diagnostic workload;
removing a workload from the storage device; and
scheduling servicing of the storage device by a technician.

9. A non-transitory machine-readable medium having instructions stored therein, which when executed by a processor, cause the processor to perform operations for managing data processing systems, the operation comprising:
obtaining use data for a storage device and diagnostic data for the storage device, the storage device being part of one of the data processing systems;
obtaining, using the use data, predicted future use data for each future date of a set of future dates;
obtaining, using the use data and the predicted future use data for one future date of the set of the future dates, a use quantification;
obtaining, using the use quantification and the diagnostic data, a prediction regarding operation of the storage device for the one future date of the set of the future dates;
making a determination regarding whether the prediction indicates failure in the operation of the storage device by the one future date of the set of the future dates; and
in a first instance of the determination where the prediction indicates the failure in the operation of the storage device by the one future date of the set of the future dates:
performing a proactive action set to manage a predicted impact of the failure in the operation on the storage device by the one future date of the set of future dates.

10. The non-transitory machine-readable medium of claim 9, wherein obtaining the use data for the storage device and the diagnostic data for the storage device comprises:
obtaining, by a management controller hosted by the one of the data processing systems, the use data for the storage device and the diagnostic data for the storage device.

11. The non-transitory machine-readable medium of claim 9, wherein the use data comprises information relating to, at least, storage utilization of the storage device, central processing unit utilization of a processor of the one of the data processing systems, and storage capacity of the storage device.

12. The non-transitory machine-readable medium of claim 9, wherein the diagnostic data comprises information relating to, at least, read statistics, physical condition, and error counts of the storage device.

13. The non-transitory machine-readable medium of claim 9, wherein obtaining the use quantification comprises:
obtaining a weighted sum of the use data and the future use data for the one future date of the set of the future dates.

14. The non-transitory machine-readable medium of claim 9, wherein the use quantification comprises a composite measure of predicted use and present use of the storage device.

15. A data processing system, comprising:
a processor; and
a memory coupled to the processor to store instructions, which when executed by the processor, cause the processor to perform operations for managing data processing systems, the operations comprising:
obtaining use data for a storage device and diagnostic data for the storage device, the storage device being part of one of the data processing systems;
obtaining, using the use data, predicted future use data for each future date of a set of future dates;
obtaining, using the use data and the predicted future use data for one future date of the set of the future dates, a use quantification;

obtaining, using the use quantification and the diagnostic data, a prediction regarding operation of the storage device for the one future date of the set of the future dates;

making a determination regarding whether the prediction indicates failure in the operation of the storage device by the one future date of the set of the future dates; and in a first instance of the determination where the prediction indicates the failure in the operation of the storage device by the one future date of the set of the future dates:

performing a proactive action set to manage a predicted impact of the failure in the operation on the storage device by the one future date of the set of future dates.

16. The data processing system of claim 15, wherein obtaining the use data for the storage device and the diagnostic data for the storage device comprises:

obtaining, by a management controller hosted by the one of the data processing systems, the use data for the storage device and the diagnostic data for the storage device.

17. The data processing system of claim 15, wherein the use data comprises information relating to, at least, storage utilization of the storage device, central processing unit utilization of a processor of the one of the data processing systems, and storage capacity of the storage device.

18. The data processing system of claim 15, wherein the diagnostic data comprises information relating to, at least, read statistics, physical condition, and error counts of the storage device.

19. The data processing system of claim 15, wherein obtaining the use quantification comprises:

obtaining a weighted sum of the use data and the future use data for the one future date of the set of the future dates.

20. The data processing system of claim 15, wherein the use quantification comprises a composite measure of predicted use and present use of the storage device.

* * * * *

UNITED STATES PATENT AND TRADEMARK OFFICE
CERTIFICATE OF CORRECTION

Page 1 of 1

PATENT NO. : 12,248,682 B1
APPLICATION NO. : 18/417296
DATED : March 11, 2025
INVENTOR(S) : Sudhir Vittal Shetty and Deepak Nagarajegowda It is certified that error appears in the above-identified patent and that said Letters Patent is hereby corrected as shown below:

In the Claims

Claim 9, Column 14, Line 2, the sentence "the operation comprising" should instead be -- the operations comprising --.

Signed and Sealed this
Seventeenth Day of June, 2025

Coke Morgan Stewart
*Acting Director of the United States Patent and Trademark Office*